(12) United States Patent
Hamaya et al.

(10) Patent No.: US 9,303,768 B2
(45) Date of Patent: Apr. 5, 2016

(54) VALVE STEM SEAL DEVICE

(75) Inventors: Yasunari Hamaya, Fukushima (JP); Kokichi Hamamoto, Fukushima (JP)

(73) Assignee: NOK Corporation (JP)

( * ) Notice: Subject to any disclaimer, the term of this patent is extended or adjusted under 35 U.S.C. 154(b) by 231 days.

(21) Appl. No.: 14/117,808

(22) PCT Filed: Nov. 29, 2011

(86) PCT No.: PCT/JP2011/077456
§ 371 (c)(1),
(2), (4) Date: Nov. 14, 2013

(87) PCT Pub. No.: WO2013/008348
PCT Pub. Date: Jan. 17, 2013

(65) Prior Publication Data
US 2014/0077459 A1 Mar. 20, 2014

(30) Foreign Application Priority Data

Jul. 9, 2011 (JP) ................. 2011-152385

(51) Int. Cl.
*F16F 9/36* (2006.01)
*F16J 15/32* (2006.01)
*F01L 3/08* (2006.01)

(52) U.S. Cl.
CPC .. *F16J 15/32* (2013.01); *F01L 3/08* (2013.01); *F01L 2101/00* (2013.01)

(58) Field of Classification Search
CPC ..... F16J 15/32; F16J 15/3224; F16J 15/3268; F16J 15/3204; F01L 3/08
USPC ....................................... 277/502
See application file for complete search history.

(56) References Cited

U.S. PATENT DOCUMENTS

| 4,061,447 | A | * | 12/1977 | Kato | ............................. 418/142 |
| 4,108,287 | A | * | 8/1978 | Kato | ............................. 188/315 |
| 4,542,811 | A | * | 9/1985 | Miura | ...................... 188/322.17 |
| 4,884,665 | A | * | 12/1989 | Parker et al. | ............. 188/322.17 |
| 5,110,142 | A | * | 5/1992 | Szott | ............................. 277/502 |
| 7,328,679 | B2 | | 2/2008 | Ihara et al. | |
| 2007/0017475 | A1 | | 1/2007 | Ihara et al. | |

FOREIGN PATENT DOCUMENTS

| JP | S462577 Y1 | 1/1971 |
| JP | S61128308 U | 8/1986 |
| JP | S62169205 U | 10/1987 |
| JP | H10205623 A | 8/1998 |
| JP | 2003083014 A | 3/2003 |
| JP | 2005127147 A | 5/2005 |

* cited by examiner

*Primary Examiner* — Vishal Patel
(74) *Attorney, Agent, or Firm* — Harness, Dickey & Pierce, P.L.C.

(57) ABSTRACT

A valve stem seal device has a valve stem guide, a cylindrical metallic ring retained to an outer periphery of the valve stem guide, a rubbery elastic seal lip integrally formed in one end side of the metallic ring, and hermetically sliding to the valve stem, and a valve stem seal having the cylindrical metallic ring and the seal lip and fixed to the valve stem guide side. The valve stem seal device has a stop ring retained between a circular-truncated-cone-shaped surface which is expanded toward a side of the seal lip formed in an outer peripheral surface of the valve stem guide, and a cylindrical inner peripheral surface of the metallic ring. The stop ring has a cut part, and a movement limiting means for limiting a movement in an axial direction of the stop ring is provided in the other end side of the metallic ring.

9 Claims, 6 Drawing Sheets

VALVE STEM SEAL DEVICE

CROSS-REFERENCE TO RELATED APPLICATIONS

This application is a U.S. National Stage Application of International Application No. PCT/JP2011/077456 filed on Nov. 29, 2011, and published in Japanese as WO 2013/008348 on Jan. 17, 2013. This application claims priority to Japanese Application No. 2011-152385 filed on Jul. 9, 2011. The disclosures of the above applications are incorporated herein by reference.

BACKGROUND OF THE INVENTION

1. Field of the Invention

The present invention relates to a valve stem seal device, and more particularly to a valve stem seal device used in a valve portion of a motor vehicle engine or a general industrial machinery.

2. Description of the Conventional Art

Conventionally, as shown in FIG. 6, there has been known a valve stem seal device structured such that a valve stem seal 700 is fixed to a valve stem guide 100 side, the valve stem seal 700 being provided with a cylindrical metallic ring 200 which is retained to an outer periphery of the valve stem guide 100, and a seal lip 400 which is integrally formed in one end side of the metallic ring 200, hermetically slides in relation to the valve stem 300 and is made of a rubbery elastic material (Japanese Patent No. 3155483 and Japanese Unexamined Patent Publication No. 2005-127147).

Further, the valve stem seal device is structured such that a projection 220 formed in a rubbery elastic material layer 210 formed in an inner peripheral surface of the metallic ring 200 is engaged with a groove 110 provided in an outer peripheral surface of the valve stem guide 100, for preventing the valve stem seal 700 from falling away from the valve stem guide 100.

However, since the projection 220 is made of the rubbery elastic material, not only a mechanical strength is not sufficient, but also a fitting and fixing force is lowered by a thermal influence and a change with time. Accordingly, in the case that a load caused by vibration or a load caused by rise of an internal pressure in the valve stem seal device is applied, not only a seal function of the valve stem seal 700 is lowered, but also there has been brought about a problem that the valve stem seal 700 falls away from the valve stem guide 100 in the worst case.

SUMMARY OF THE INVENTION

Problem to be Solved by the Invention

The present invention is made by taking the above points into consideration, and an object of the present invention is to provide a valve stem seal device which can avoid a problem that a valve stem seal falls away from a valve stem guide, as well as a good seal function of the valve stem seal can be maintained, even in the case that a load caused by vibration or a load caused by rise of an internal pressure in the valve stem seal device is applied, since an engagement between the valve stem seal and the valve stem guide has a sufficient mechanical strength, and a fitting and fixing force is not lowered by a thermal influence and a change with age.

Means for Solving the Problem

The valve stem seal device according to the present invention is a valve stem seal device comprising:
a valve stem guide;
a cylindrical metallic ring which is retained to an outer periphery of the valve stem guide;
a seal lip which is integrally formed in an end side of the metallic ring, hermetically slides in relation to the valve stem, and is made of a rubbery elastic material;
a valve stem seal which is provided with the cylindrical metallic ring and the seal lip; and
the valve stem seal being fixed to the valve stem guide side,
wherein the valve stem seal device has a stop ring fitted and retained between a circular truncated cone-shaped surface which is expanded toward a side of the seal lip formed in an outer peripheral surface of the valve stem guide, and a cylindrical inner peripheral surface of the metallic ring, the stop ring has a cut part, and a movement limiting means for limiting a movement in an axial direction of the stop ring is provided in the other end side of the metallic ring.

Effect of the Invention

The present invention achieves effects described below.

According to the valve stem seal device of the invention described in the first aspect, since an engagement between the valve stem seal and the valve stem guide is provided with a sufficient mechanical strength, and a fitting and fixing force is not lowered by a thermal influence and a change with time, a good seal function of the valve stem seal can be maintained even in the case that the load caused by the vibration or the load caused by the internal pressure rise within the valve stem seal device is applied, and it is possible to avoid a problem that the valve stem seal falls away from the valve stem guide.

Further, according to the valve stem seal device of the invention described in the second aspect, it is possible to securely carry out the fitting and fixing operation between the valve stem seal and the valve stem guide with the stop ring, by folding a part of the metallic ring.

Further, according to the valve stem seal device of the invention described in the third aspect, it is possible to securely carry out the fitting and fixing operation between the valve stem seal and the valve stem guide with the stop ring, and it is easy to detach the valve stem seal from the valve stem guide.

Further, according to the valve stem seal device of the invention described in, the fourth aspect even if the movement limiting means for limiting the movement in the axial direction of the stop ring is constructed by a flange portion, it is possible to detach the valve stem seal from the valve stem guide.

Further, according to the valve stem seal device of the invention described in the fifth aspect, it is possible to enhance the fitting force between the stop ring and the valve stem guide.

Further, according to the valve stem seal device of the invention described in the sixth aspect, it is possible to enhance the fitting force between the stop ring and the metallic ring.

DETAILED DESCRIPTION OF PREFERRED EMBODIMENTS

A description will be given below of a best mode for carrying out the present invention.

A description will be given of a valve stem seal device of a first aspect according to the present invention on the basis of FIGS. 1 and 2.

Figure 1:
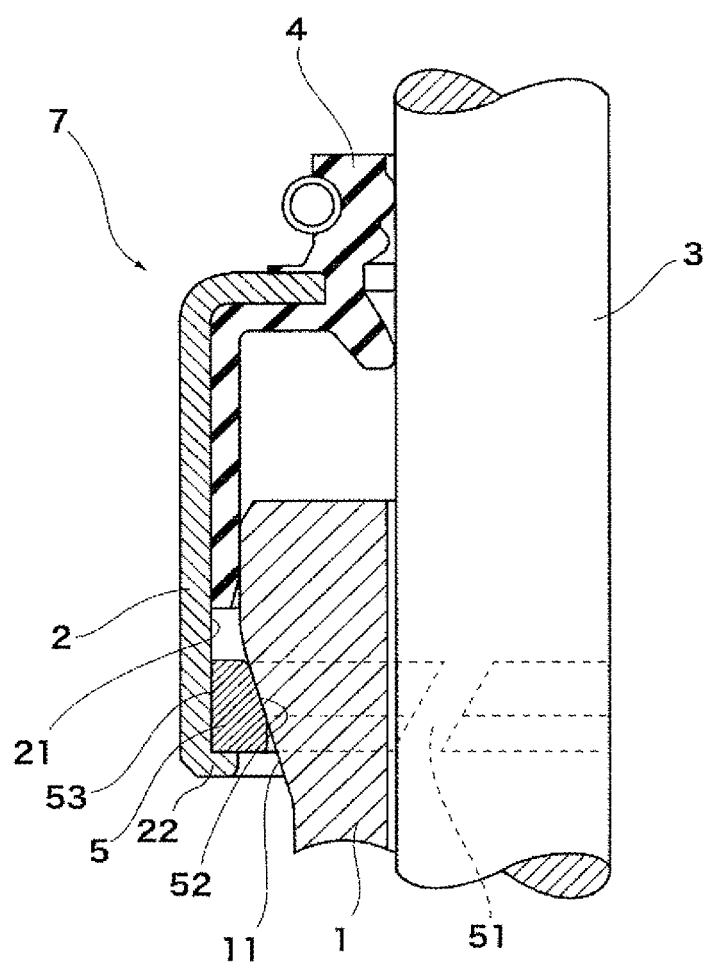
FIG. 1 is a vertical cross sectional view of a valve stem seal device of a first aspect according to the present invention.

In FIG. 1, the valve stem seal device according to the present invention is structured such that a valve stem seal 7 is fixed to a valve stem guide 1 side, the valve stem seal 7 being provided with a cylindrical metallic ring 2 which is retained to an outer periphery of the valve stem guide 1, and a seal lip 4 which is integrally formed in one end side of the metallic ring 2, hermetically seals with a valve stem 3 and is made of a rubbery elastic material.

Further, as a countermeasure for fixing the valve stem seal 7 to the valve stem guide 1 side, there are provided a circular truncated cone-shaped surface 11 which is formed in an outer peripheral surface of the valve stem guide 1 and is expanded toward the seal lip 4 side, and a stop ring 5 which is fitted and retained between the circular truncated cone-shaped surface 11 and a cylindrical inner peripheral surface 21 of the metallic ring 2, the stop ring 5 has a cut part 51 at one position on the circumference, and a flange portion 22 obtained by folding inward the metallic ring 2 is provided in the other end side of the metallic ring 2 for limiting a movement in an axial direction of the stop ring 5.

Further, the stop ring 5 is formed on its inner peripheral surface a circular truncated cone-shaped portion 52 which corresponds to the circular truncated cone-shaped surface 11 of the valve stem guide 1, and is formed its outer peripheral surface a cylindrical outer peripheral surface 53 which corresponds to the cylindrical inner peripheral surface 21 of the metallic ring 2.

Figure 2:
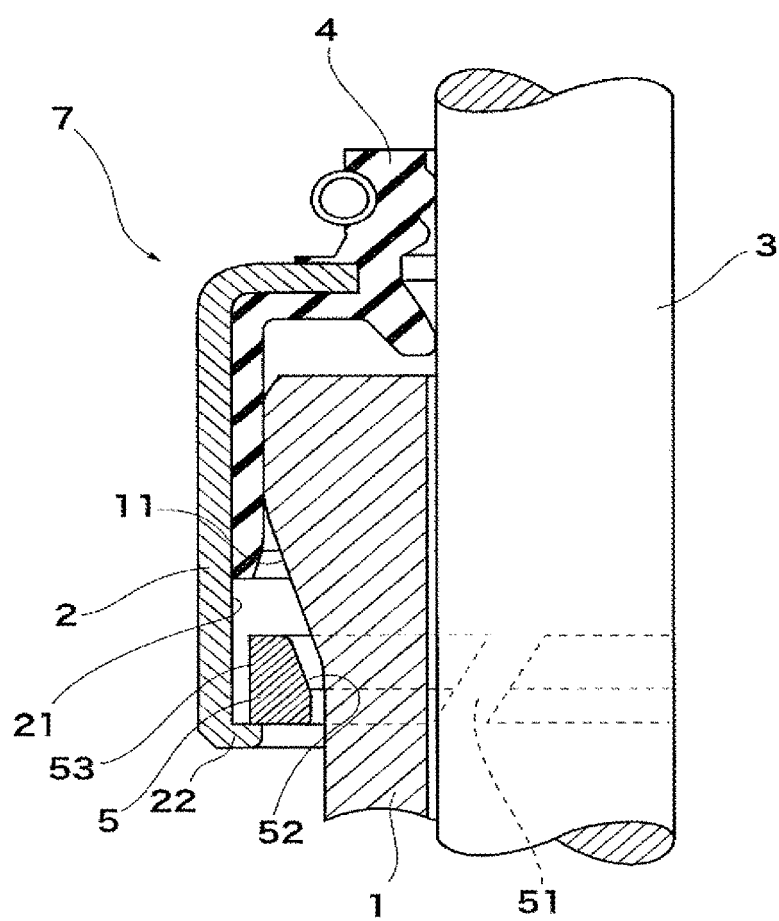
FIG. 2 is a vertical cross sectional view of a state before the valve stem seal device in FIG. 1 is fixed.

Further, the valve stem seal device having the structure mentioned above is assembled into a state shown in FIG. 1 via a state as shown in FIG. 2.

In other words, in a state in which the valve stem seal 7 comes close to the valve stem guide 1 side (in a state in which the valve stem seal 7 moves downward in the drawing) as shown in FIG. 2, a gap between an inner peripheral end of the flange portion 22 and an outer peripheral surface of the valve stem guide 1 is provided with a magnitude with which the stop ring 5 can pass through the gap.

Accordingly, the stop ring 5 is passed through the gap between the inner peripheral end of the flange portion 22 and the outer peripheral surface of the valve stem guide 1, by contracting the stop ring 5 having the cut part 51 at one position on the circumference (by making end portions of the cut part 51 close to each other).

Further, when the stop ring 5 passes through the gap, the stop ring 5 expands on the basis of its own restoring force so as to become a state shown in FIG. 2.

As a result, the gap of the cut part 51 returns to the original gap magnitude, and a lower end surface of the stop ring 5 comes into contact with the flange portion 22 and is limited its downward movement in the axial direction.

When the valve stem seal 7 is moved upward in the drawing from the state in FIG. 2, the stop ring 5 is expanded while the circular truncated cone-shaped portion 52 provided in the inner peripheral side of the stop ring 5 comes into contact with the circular truncated cone-shaped surface 11 provided in the valve step guide 1, and the cylindrical outer peripheral surface 53 provided in the outer peripheral side of the stop ring 5 comes into contact with the cylindrical inner peripheral surface 21 of the metallic ring 2.

Since the stop ring 5 is inhibited its further expansion by the cylindrical inner peripheral surface 21 of the metallic ring 2 in this state, the stop ring 5 does not move upward in the drawing any more.

The state shown in FIG. 1 indicates this state.

Accordingly, since the engagement between the valve stem seal 7 and the valve stem guide 1 is provided with a sufficient mechanical strength, and the fitting and fixing force is not lowered by the thermal influence and the change with time, a good seal function of the valve stem seal 7 can be maintained even in the case that the load caused by the vibration or the load caused by the internal pressure rise within the valve stem seal device is applied, and it is possible to avoid the problem that the valve stem seal 7 falls away from the valve stem guide 1.

As a material of the stop ring 5, a synthetic resin material and a metallic material are appropriately selected and employed, however, the synthetic resin material is preferable in the light of easiness in contraction.

As the rubbery elastic material constructing the seal lip 4, a fluorine rubber, an NBR and a silicone rubber are appropriately selected and employed.

Figure 3:
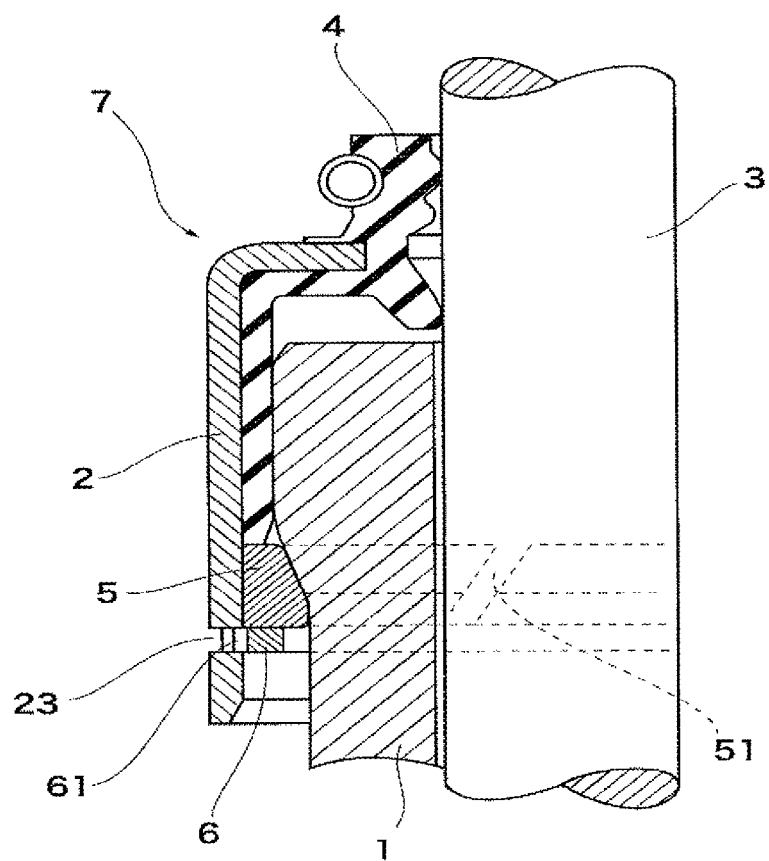
FIG. 3 is a vertical cross sectional view of a valve stem seal device of a second aspect according to the present invention.

Next, a description will be given of a valve stem seal device of a second aspect according to the present invention on the basis of FIGS. 3 to 5.

A different point from the valve stem seal device according to the first aspect is that the movement limiting means for limiting the movement in the axial direction of the stop ring 5 according to the first aspect is constructed by the flange portion 22 which is obtained by folding inward the metallic ring 2, however, the movement limiting means for limiting the movement in the axial direction of the stop ring 5 according to the second aspect is constructed by a retaining ring 6 which is provided with a projection portion 61 engaging with a retaining hole 23 provided in the metallic ring 2.

Figure 4:
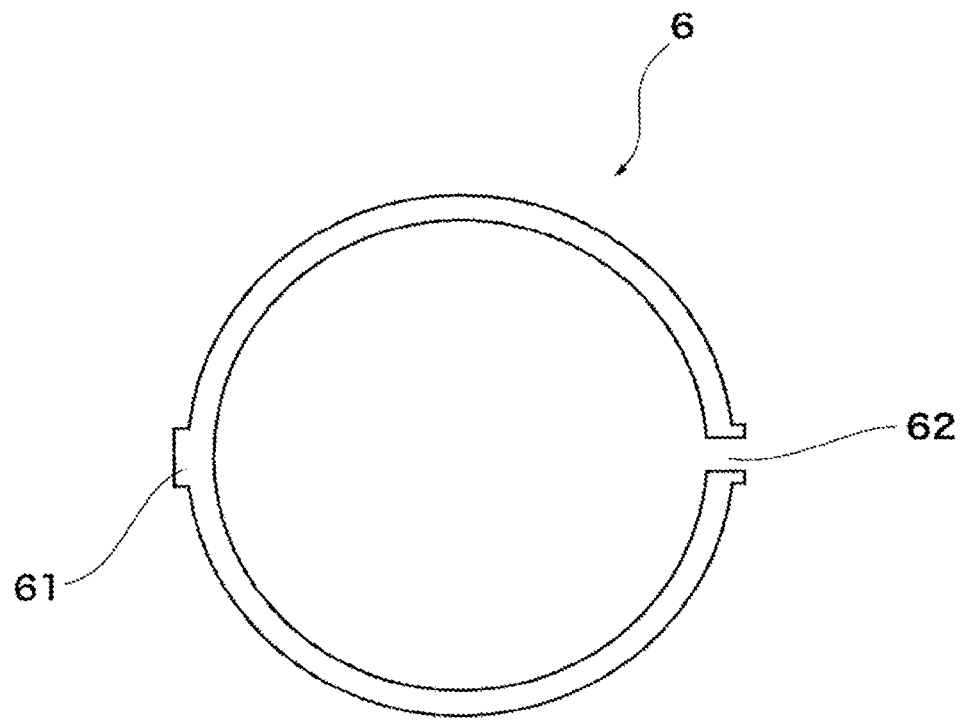
FIG. 4 is a plan view of a retaining ring which is used in the valve stem seal device according to the second aspect.

In other words, the retaining ring 6 is provided with a cut part 62 at one position on a circumference of the metallic ring, and is formed a projection portion 61 at a position which is 180 degrees deviated from the cut part 62 as shown in FIG. 4.

Figure 5:
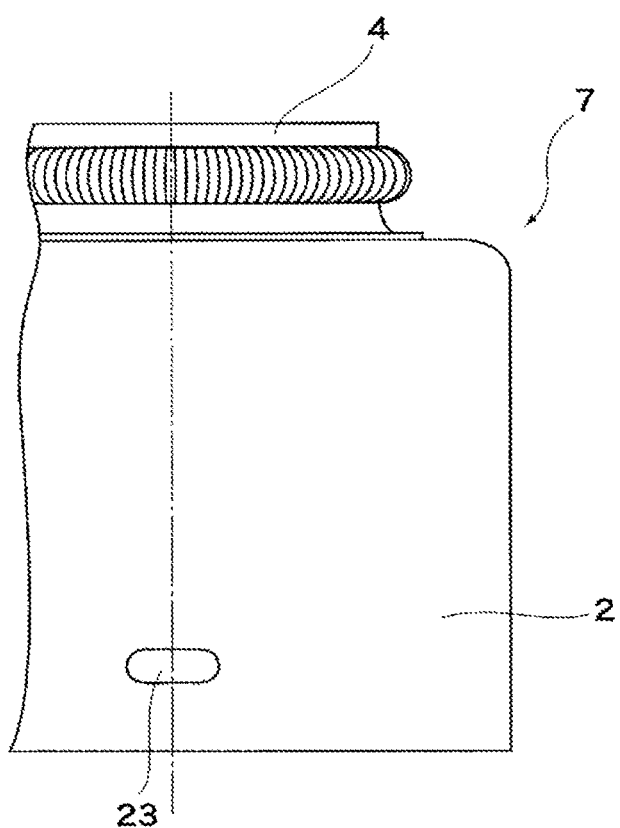
FIG. 5 is a partial side elevational view of the valve stem seal device of the second aspect according to the present invention.
Figure 6:
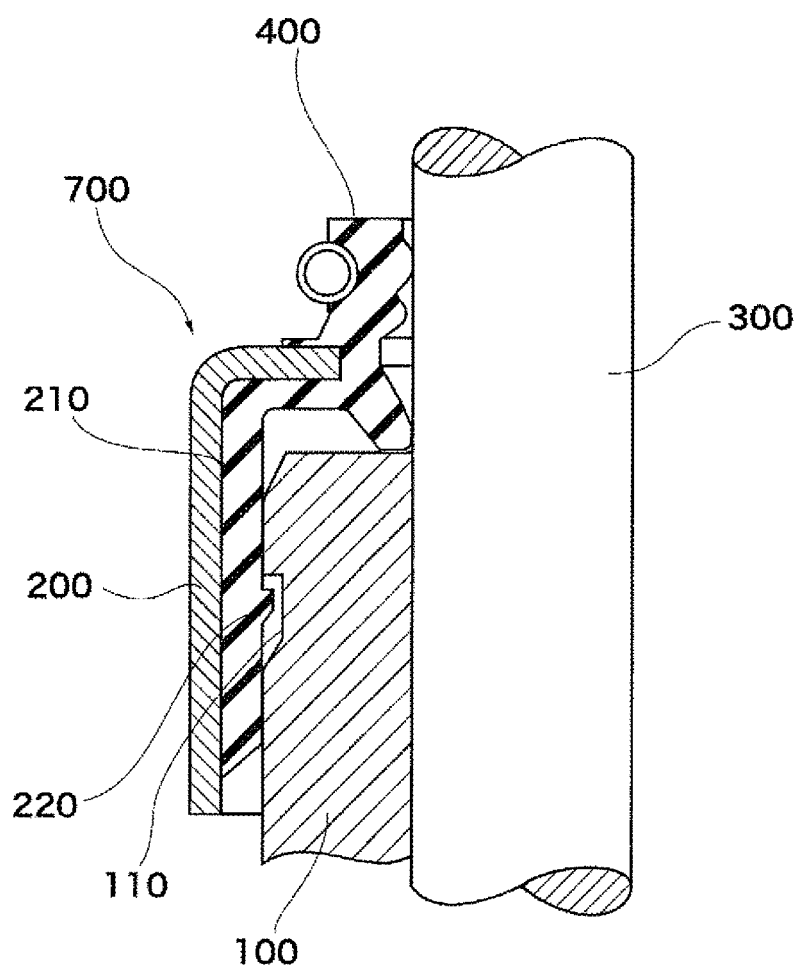
FIG. 6 is a vertical cross sectional view of a valve stem seal device according to a prior art.

Further, the stop ring 5 is inserted into the cylindrical inner peripheral surface 21 of the metallic ring 2 while contracting the retaining ring 6 in a state in which the stop ring 5 is fitted and retained between the circular truncated cone-shaped surface 11 which is expanded toward the seal lip 4 side formed on the outer peripheral surface of the valve stem guide 1, and the cylindrical inner peripheral surface 21 of the metallic ring 2, and the projection portion 61 of the retaining ring 6 engages with the retaining hole 23 provided in the metallic ring 2 of the valve stem seal 7 as shown in FIG. 5, thereby limiting the movement in the axial direction of the stop ring 5.

According to the structure mentioned above, the stop ring 5 can be detached together with the retaining ring 6 by pressing the projection portion 61 of the retaining ring 6 inward in a diametrical direction via the retaining hole 23.

As a result, it is possible to securely carry out the fitting and fixing operation between the valve stem seal 7 and the valve stem guide 1 by the stop ring 5, and it is easy to detach the valve stem seal 7 from the valve stem guide 1.

Further, in the case that the metallic ring 2 is structured such that a plurality of notches are formed from the other end side, which is not shown, it is easy to expand the metallic ring 2. Accordingly, even in the case that the movement limiting means for limiting the movement in the axial direction of the stop ring 5 is constructed by the flange portion 22, it is possible to detach the valve stem seal 7 from the valve stem guide 1.

Further, it goes without saying that the present invention is not limited to the best mode for carrying out the invention mentioned above, but can be variously modified without disparting the scope of the present invention.

INDUSTRIAL APPLICABILITY

The present invention is useful for the valve stem seal device which is used in a valve portion of a motor vehicle engine or a general industrial machinery.

What is claimed is:

1. A valve stem seal device comprising:
   a valve stem guide;
   a cylindrical metallic ring which is retained to an outer periphery of the valve stem guide;
   a seal lip which is integrally formed at a first end side of said metallic ring, hermetically slides in relation to the valve stem guide, and is made of a rubbery elastic material;
   a valve stem seal which is provided with the cylindrical metallic ring and the seal lip; and
   the valve stem seal being fixed to a side of said valve stem guide,
   wherein said valve stem guide has a circular truncated cone-shaped surface formed in an outer peripheral surface of said valve stem guide, said circular truncated cone-shaped surface expanding toward a side of said seal lip, and
   wherein a stop ring is fitted and retained between said circular truncated cone-shaped surface and a cylindrical inner peripheral surface of said metallic ring,
   said stop ring has a cut part, and
   a movement limiting means for limiting a movement in an axial direction of said stop ring is provided at a second end side of said metallic ring,
   wherein a circular truncated cone-shared portion corresponding to said circular truncated cone-shaped surface is formed in an inner peripheral surface of said stop ring.

2. The valve stem seal device according to claim 1, wherein said movement limiting means is constructed by a flange portion which is obtained by folding inward the second end side of said metallic ring.

3. The valve stem seal device according to claim 1, wherein said movement limiting means is constructed by a retaining ring which is provided with a projection portion engaging with a retaining hole provided in said metallic ring.

4. The valve stem seal device according to claim 1, wherein said metallic ring has a plurality of notches which are formed from the second end side.

5. The valve stem seal device according to claim 1, wherein a cylindrical outer peripheral surface corresponding to said cylindrical inner peripheral surface is formed in an outer peripheral surface of said stop ring.

6. The valve stem seal device according to claim 2, wherein said metallic ring has a plurality of notches which are formed from the second end side.

7. The valve stem seal device according to claim 3, wherein said metallic ring has a plurality of notches which are formed from the second end side.

8. The valve stem seal device according to claim 2, wherein a cylindrical outer peripheral surface corresponding to said cylindrical inner peripheral surface is formed in an outer peripheral surface of said stop ring.

9. The valve stem seal device according to claim 3, wherein a cylindrical outer peripheral surface corresponding to said cylindrical inner peripheral surface is formed in an outer peripheral surface of said stop ring.

* * * * *